Oct. 27, 1942.                C. McDERMOTT                2,299,762
                              BICYCLE LIGHT
                          Filed March 2, 1938
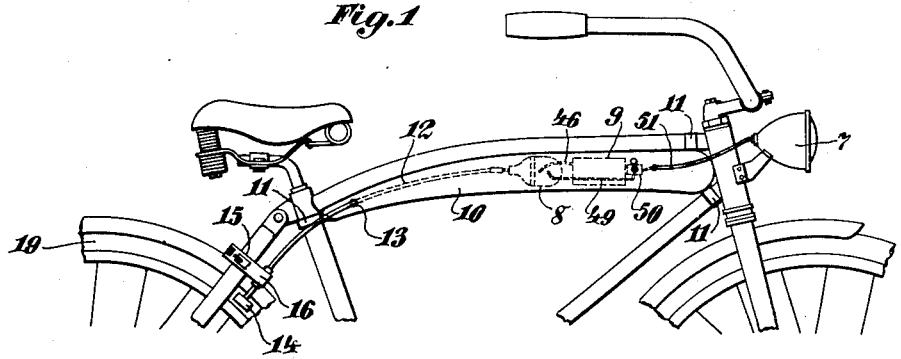
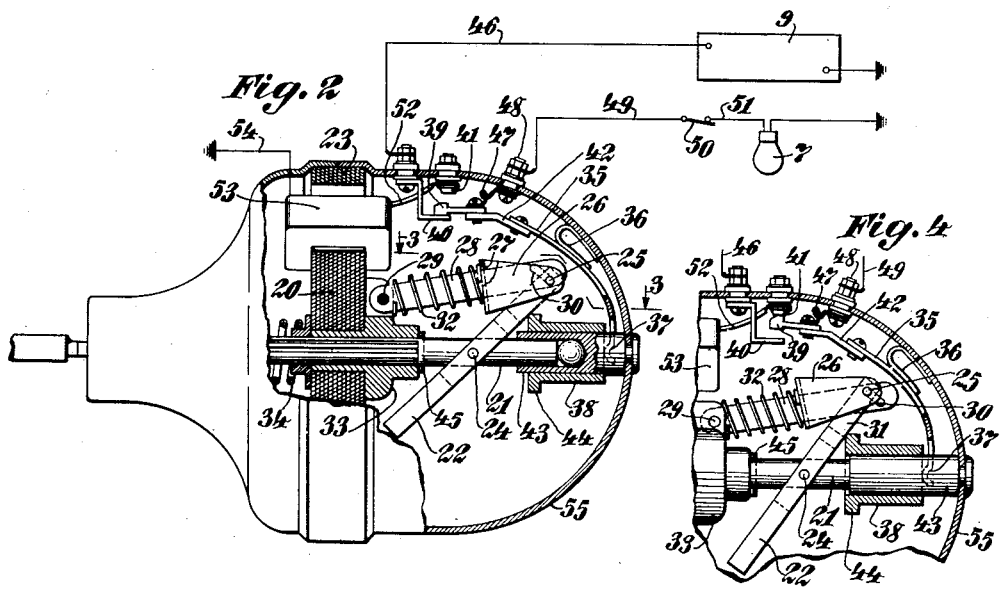
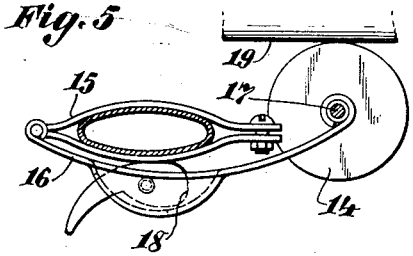
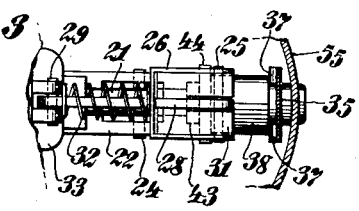
INVENTOR.
Carl McDermott,
BY
ATTORNEY.

Patented Oct. 27, 1942

2,299,762

UNITED STATES PATENT OFFICE 2,299,762

BICYCLE LIGHT

Carl McDermott, Freehold, N. J.

Application March 2, 1938, Serial No. 193,405

1 Claim. (Cl. 171—313)

The invention herein disclosed relates to lights for bicycles.

Special objects of the invention are to provide a practical and efficient form of light operable by current from a wheel-driven generator and to provide for automatically cutting in a secondary source of lighting current when the bicycle stops or slows down to a point where the generator is no longer effective.

A further object of the invention is to incorporate the complete lighting system in a form readily applicable to bicycles now in use.

Other desirable objects and the novel features of construction, combinations and relations of parts by which all objects are attained are set forth and will appear in the course of the following specification.

The drawing accompanying and forming part of the specification illustrates one commercial embodiment of the invention. Structure however may be changed and modified as required all within the true intent and scope of the invention as hereinafter defined and broadly claimed.

Fig. 1 is a side view of an embodiment of the invention as in use, parts of the bicycle structure being broken away.

Fig. 2 is a side elevation, partly in section showing the generator and automatic switch, with circuit connections indicated diagrammatically.

Fig. 3 is a broken part sectional detail as on line 3—3 of Fig. 2.

Fig. 4 is a broken sectional detail illustrating the switch shown in Fig. 2 in the other position.

Fig. 5 is a broken sectional view of the mounting bracket and control cam for effecting engagement and release of the friction roller in respect to the tire of the rear wheel.

In the present disclosure, the head lamp indicated at 7, is supplied with current from either a wheel driven generator 8, or a separate current source represented by battery 9.

Both generator and battery are indicated as mounted within an elongated casing 10, usually called the "tank," supported by brackets 11, beneath the top bar of the frame. This "tank" is usually made in two parts, readily separable and the generator and battery are removably supported therein, preferably in the relation shown, that is, with the generator toward the rear and the battery toward the front. The reason for this relation is to shorten the drive connections for the generator and which consist of flexible drive shafting 12, extending rearwardly out through the tank at 13, and carrying at the rearmost end a friction roller 14, engageable with the side of the back tire.

A special bracket is indicated at 15, which can be clamped over one of the rear forks of the frame and which carries a spring arm 16, Fig. 5, supporting the end of the sheath of the flexible shafting at 17, and controlled by a cam or turn-button 18, to position the drive roller 14, in engagement with or clear of the tire 19, of the rear wheel.

The generator is shown as of the type disclosed in the Carl McDermott Patent 2,088,029 of July 27, 1937, involving a permanent magnet armature 20, slidingly keyed on a shaft 21, and shiftable by a governor weight 22, in respect to the field structure 23, to maintain substantially constant voltage at varying speeds. This governor however, in the present instance, has been modified to effect as well automatic changeover from generator to battery current as the generator slows down or comes to a stop.

In Figs. 2, 3 and 4, the governor weight 22, is indicated as pivoted transversely on the armature shaft at 24, and as having pivoted on one end of it at 25, a yoke 26. The intermediate arch portion of this yoke is shown as slotted at 27, to freely pass the link 28, which is pivoted at one end at 29, to the hub portion of the armature and at the opposite end has an inclined cam slot 30, engaging over the yoke pivot pin 25, the governor weight being slotted at 31, to accommodate this end portion of the link. A spring 32 is shown engaged about the link 28, between the armature hub 33, and the yoke 26. This spring is lighter than the spring 34, which as in the McDermott patent returns the sliding armature to position fully within the field, in opposition to the governor.

The automatic switch for changing over from generator to battery operation and vice versa is shown as consisting of a double throw switch lever 35, supported by an expansion spring 36, to engage at one end at 37, a sliding sleeve 38, and to carry a contact 39, at its opposite end into engagement with one or the other of the oppositely positioned contacts 40, 41. The contact 39, on the movable switch lever is indicated as insulated as by suitable piece of insulation 42.

The sliding sleeve 38 is shown as mounted for free movement over the stationary bearing post 43, in which the end of the armature shaft is journalled and as carrying flange 44, for engagement by the back of the governor weight 22.

In the position of rest indicated in Fig. 2, the return spring 34 holds the armature in the fully coupled position of armature and field, against stop pin 45, and in this relation, the lighter spring 32 acting against the pivoted yoke 26, holds the governor weight shifted its fullest extent of movement thrusting against the flange 44, of sleeve 38 and causing the latter to hold the switch lever 35, rocked to its left-handed position with movable contact 39, in engagement with fixed insulated contact 40. This contact is shown as connected by wiring 46, with one pole of battery 9. The opposite pole of the battery is suitably grounded as indicated in diagrammatic fashion. Movable contact 39 is shown as connected by flexible lead 47, with a fixed insulated terminal 48, connected by wiring 49, hand control switch 50, and wiring 51, with head lamp 7, the latter having a grounded return as indicated.

Thus with the parts at rest or in a condition approaching a state of rest, the governor will rock the movable switch arm to cut the battery into the lighting circuit.

With movement of the bicycle, the governor comes into action and its first effect as indicated in Fig. 4, is to take up the lost motion at the slot 30, in the end of link 28, against the tension of spring 32. This movement, which if desired, may occur at say a low speed of 2½ miles per hour, is sufficient to permit the switch lever under force of its supporting spring 36, to rock righthandedly and carry contact 39 into engagement with insulated contact 41. The latter is shown connected by wire 52, with field winding 53, and as the latter has a grounded return as indicated at 54, circuit will then be complete from the generator through the lamp, assuming hand switch 50 in the closed position. As speed drops back to the limit predetermined by the setting of the parts, the governor action will automatically switch over from generator to battery operation, assuming in each instance that the hand switch 50, which controls both generator and battery operation is closed and that the drive roller of the flexible shaft is in engagement with the tire.

The spaced contacts 40, 41, and the terminal 48, of the automatic changeover switch may conveniently be mounted in insulated relation on the shell or casing 55, of the generator, substantially as indicated in Figs. 2 and 4. In the latter view, the governor is shown in the relatively low speed position in which it has just thrown the switch to generator operation. With further increase in speed, the governor, having fully taken up lost motion at 30, will shift the armature to maintain substantially constant voltage and during such running, the governor weight will run entirely free of the switch shifting sleeve 38. The shape of the cam slot 30 maintains the end of link 28, clear of the movable switch lever in all positions of the parts.

The various parts of the apparatus are all of simple sturdy design and they are all properly housed and protected. The system as a whole is readily applicable to existing bicycle constructions and the battery and other replaceable parts are readily accessible.

What is claimed is:

A bicycle lighting system, comprising a small closed, generator casing for mounting on a bicycle, a stationary field in said casing, including a field winding, a shaft journalled in said casing coaxially of said field, said shaft projecting from one end of said casing and having a roller for driven engagement with a tire of a bicycle, an armature slidably mounted on said shaft and rotating within said field, said armature being a permanent magnet and exerting force to magnetically attract the same toward a magnetically centered position within the field structure, a governor lever pivoted transversely on and thereby rotated by said shaft, connections between said lever and slidable armature to effect the rocking of said lever in one direction in the magnetic return movement of said armature on the shaft and to enable said lever, under centrifugal force, to rock in the opposite direction to shift the armature out of magnetically centered position in the field, a sleeve slidingly and rotatably mounted coaxially at one end of the shaft and arranged to be shifted longitudinally of said shaft upon the return movement of said slidable armature toward magnetically centered position in the field, a switch lever in the casing and positioned to be engaged by the outer end of said sleeve, opposed switch contacts in the casing engagable by said switch lever in the movement of the same in opposite directions, said switch lever being spring biased into engagement with one of said contacts and into engagement with said outer end of said sleeve, connections from said normally engaged switch contact to said field winding, a bicycle lamp, a battery for said lamp, connections from the other of said opposed switch contacts to said battery, and electrical connections from said field-winding-biased switch lever to said lamp and to either said battery or to said field winding and operative only one or the other, depending upon the position of said switch lever as conjointly effected through the self-biasing action of said switch lever under the regulatory control of said axially shiftable permanent magnet armature and governor lever connected therewith.

CARL McDERMOTT.